Patented Apr. 14, 1942

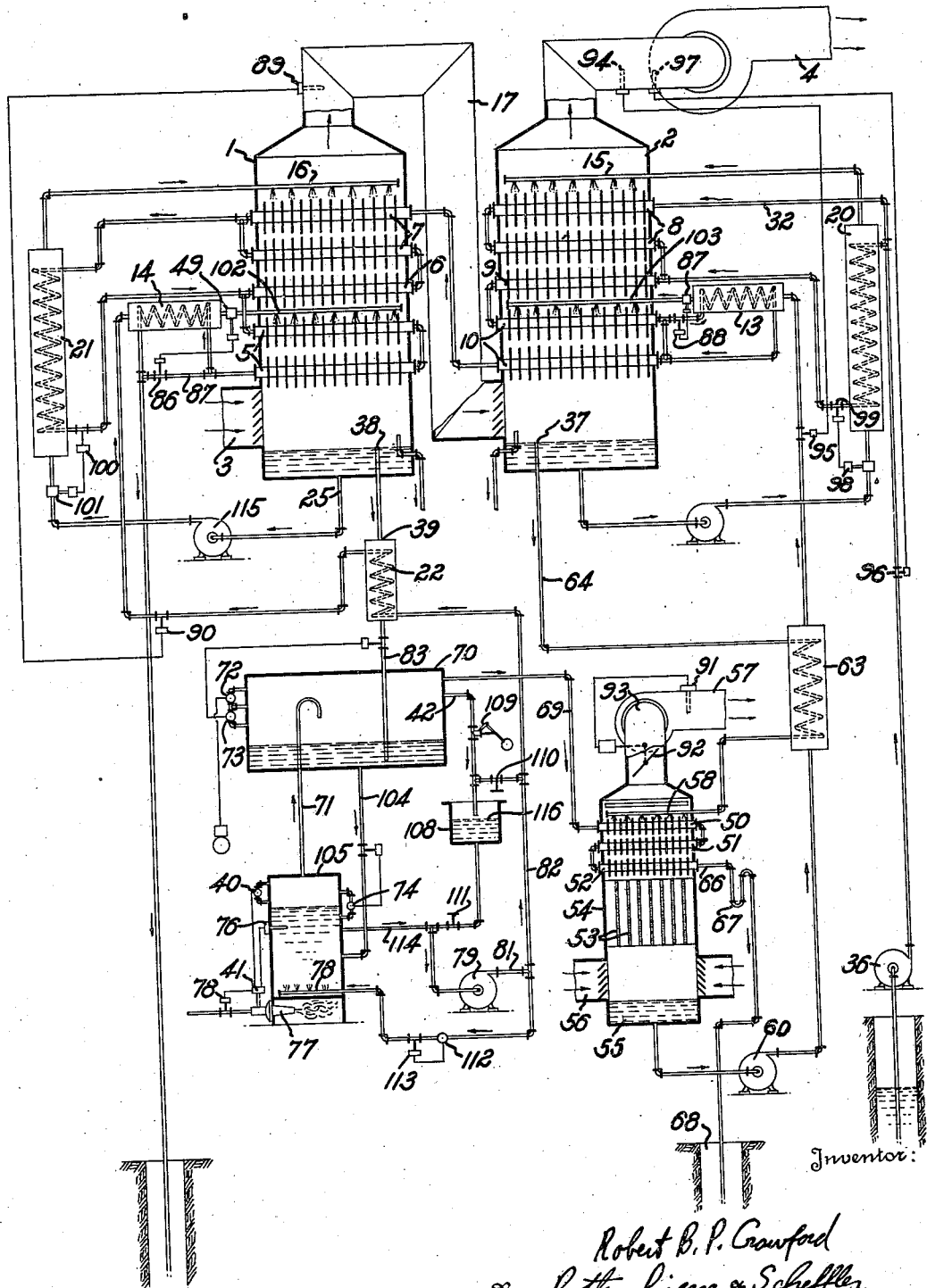

2,279,938

UNITED STATES PATENT OFFICE 2,279,938

CONDITIONING OF GASES

Robert B. P. Crawford, Miami, Fla.

Application September 15, 1938, Serial No. 230,151

5 Claims. (Cl. 183—120)

This invention relates to the conditioning of gases by adjusting the moisture content and temperature of the gases to predetermined conditions. It is particularly directed to the multi-stage dehumidification of gases with hygroscopic solutions.

A principal object of the invention is the provision of methods and apparatus whereby the efficiency of the reconcentration of hygroscopic solutions used for the dehumidification of gases may be substantially increased.

A more particular object of the invention is to provide a method and apparatus for the dehumidification of gases wherein the gas to be conditioned is passed successively in contact with a plurality of hygroscopic solutions of decreasing aqueous vapor pressures, and wherein the reconcentration of at least a portion of one of the solutions is effected by the indirect transfer of heat thereto from the vapor evolved in the concentration of another of the solutions.

A further object of the invention is to provide a method and apparatus for the dehumidification of gases wherein the gases are contacted with hygroscopic solutions in truly counter-current relation whereby the work of dehumidification is effected with a minimum of required contact surface and fluid volumes.

Other objects of the invention will be apparent from the following description of an illustrative embodiment of the invention as applied by way of example to the conditioning of air to comfort conditions, with particular reference to the accompanying drawing showing a semi-diagrammatic system for adjusting gases to a predetermined moisture content and temperature.

In the preferred embodiment of the invention, air is passed in contact with an extended surface of a hygroscopic solution having an aqueous vapor pressure lower than that of the air but higher than the desired final partial pressure of water vapor in the air, and thereafter is passed in contact with one or more other hygroscopic solutions of lower aqueous vapor pressure at least the last hygroscopic solution contacted with the air having an aqueous vapor pressure at least as low as the desired final partial pressure of water vapor in the air. After dilution of the solutions by removal of moisture from the air, the solution of highest vapor pressure is concentrated, for example in a boiler, and the heat of condensation of the vapors from said solution is indirectly transferred to the further solutions in the order of their decreasing vapor pressures while maintaining them under conditions of substantially lower effective aqueous partial pressures as by subjecting them to subatmospheric pressure or by lowering the effective aqueous partial pressure over them by passing a current of air over their surfaces.

The hygroscopic solutions comprise typically solutions of highly hygroscopic substances such as calcium chloride, lithium chloride, zinc chloride, glycerol or ethylene glycol or mixtures of such substances. The solutions may be maintained at different aqueous vapor pressures by using in the successive stages solutions containing increasing concentrations of the same hygroscopic substance or mixture of such substances, or by using solutions of different hygroscopic substances or different mixtures thereof.

The adjustment of the temperature of the gases is a desirable but not an essential element of the method of the invention. This may be effected independently of the humidity adjustment by passing the gases through suitable heat exchange devices. Preferably, however, the temperature adjustment is effected by indirect heat exchange between the hygroscopic liquid in one or all of the stages with a heat transfer fluid, for example, water, which may be obtained from a natural source such as a well, or may be recirculated from an evaporative cooler wherein it is cooled by the evaporative cooling effect of atmospheric air or of a portion of the gas dehumidified by the method of the invention.

In the specific example of a two-stage dehumidification method embodying the invention, to be described in connection with the drawing, 50% calcium chloride solution has been selected for the first stage and 40% lithium chloride solution for the second stage. The availability of well water at 62° F. has been assumed.

In the drawing, 1 is the first air stage, 2 is the second air stage. Air or gases to be dehumidified enter at 3, pass through stage 1 over primary cooling coils 5, and secondary coils 6 and 7, through interpass 11, through stage 2 over coils 10, 9 and 8, and conditioned air passes out at 4. Cooling water enters at 32 and leaving air at 4 is within a few degrees of the entering water temperature.

Calcium chloride brine enters stage 1 at spray header 16 at substantially 90° and 50% concentration passing down over water chilled surfaces 7 which absorb the latent heat of dehumidification. At spray header 102, 55% $CaCl_2$ at 108° is admitted and such brine gradually is cooled in temperature, while latent heat of dehumidification is absorbed in coils 5, the diluted brine leaving at 25 at substantially 100° temperature. The vapor pressure from 102 to the overflow level 38 is substantially 10 millimeters of mercury, whereas the vapor pressure at 16 is substantially 7.5 millimeters, giving a large rise in water temperature with substantially little change in vapor pressure characteristics.

Brine is overflowed at 38, enters exchanger 22 at 39 and is delivered through line 83 to release reservoir 70 and from 70 through line 104 to direct fired evaporator 105. Evaporated vapor and any brine carryover is delivered to 70 through gooseneck 71. The vapor passes through 69 to coils 50, 51 and 52 in second stage concentrator 54. Strong brine of 55% concentration or over is agitated by pump 79 through suction connection 114, discharge 81, pressure control 112—113 to discharge header 78 distributed through the boiler. Pressure on line 82 is kept sufficient by control 112—113 to insure delivery of the maximum quantity of brine required at full load through valve 90 and exchanger 14 to spray header 102.

Brine in stage 1 is recirculated through pump 115, brine cooler 21 to spray header 16, and over the heat absorbing coils 7, 6 and 5. Brine admitted at 102 has its temperature controlled slightly above the solidification point by thermostat 49, controlling the water volume through valve 86 and by-pass 87. Recirculated brine has its degree of cooling controlled by thermostat 101 and water volume valve 100. With a fixed concentration entering at 102 from the boiler, thermostat 101 senses accurately the work done in stage 1 and can be compensated with the valve to operate in a predetermined manner to promote greatest economy with varying dehumidifying duty entering at 3. Humidistat 89 in delivery air controls volume of concentrated brine admitted at 102 through valve 90.

The second stage based on using lithium chloride, for example, operates between aqueous vapor pressures of approximately 2 mm. and 67° at 15 to 4.5 mm. and 85° F. at the overflow level 37, again using a minimum amount of surface for the work done. A portion of the well water from 36 is by-passed through recirculated brine cooler 20 and reintroduced in coils 9 in the dehumidifying stage 2, and by-passed water from coils 10 is used to cool 46% concentrated lithium chloride brine supply at brine cooler 13 to 90° F. through solidification thermostat 87 and valve 88. Otherwise the second stage is similar to the first stage.

The concentrator for the second stage is an air current evaporator 54 taking super-heated steam from the release reservoir at 69 through super-heat coils 50, condensation coils 51 and condensate heating coils 52, return 66, trap 67 to hot well 68. Brine from dehumidifier 2 is taken through overflow 37, line 64, exchanger 63 to spray nozzle header 58, down over heating surfaces 50, 51, 52 and evaporating surface 53, which may be parallel asbestos sheets or other extended surface material. Outdoor air enters concentrator at 56 up through 53, 52, 51, 50, 58, induced draft fan 93 and exhausts out of doors at 57. Strong 46% lithium chloride from sump 55 is fed back to the dehumidifier through pump 60, exchanger 63, valve 95, controlled by the desired humidity sensed by humidistat 94, and cooler 13 to spray header 103.

Boiler 105 has its concentration controlled by the boiling temperature sensed at 76 which controls high-low flame on oil burner 77 and amount of oil fed through valve 75. Level controls 74, 72 and 73, alarm 84, temporary surge shut-off 85 and emergency catch tank 108 with brine loaded weight valve 109 from a safety control system which is not an essential part of the present invention. An auxiliary use of the emergency overflow tank 108 is for brine make-up by opening brine mixing-recirculating valves 110 and 111, and introducing calcium chloride flake over perforated nickel sheet 115 in tank 108. Tank 70 should be 15 feet above boiler 105 and loaded valve 109 should not open until emergency overflow 42 is full of brine, except for occasional manual checking when weight on 109 may be raised.

Thermostat 97 controls cooling water volume through valve 96. Thermostat 98 senses the load on the second stage. In general, this thermostat can be eliminated and valve 99 set by hand for required economy as the load on stage 2 in comfort design is practically constant.

41 is a relay on the boiler which shuts off the burner in case of high level indicated at 40, as well as controlling the combustion to give a definite boiling temperature. Humidistat 91 in air discharge 57 varies air volume handled by concentrator 54 through damper 92 or other appropriate means to give constant concentration to the strong brine fed into stage 2 at 103.

It will be seen that the method and apparatus described above for a particular problem include a large number of features and elements which are not essential to the operation of the invention, and that the method of operation and the form and arrangement of the apparatus may be varied widely without departing from the principle of the invention which broadly comprises the dehumidification of gases by contacting the gas with successive hygroscopic solutions of decreasing aqueous vapor pressure and concentrating the diluted solutions in multiple effect whereby the heat content of the vapors evolved from one of the solutions is used to effect the concentration of the other solutions while they are maintained under conditions of successively lower effective aqueous partial pressure.

I claim:

1. A method of conditioning gases which comprises passing a stream of gas in extended surface contact with a plurality of successive streams of hygroscopic solutions of progressively lower absolute vapor pressure and temperature, while passing a stream of cooling fluid countercurrent to said gas stream in indirect heat exchange relation with each of said streams of hygroscopic solutions to maintain the heat transfer potential between the gas stream and the hygroscopic solutions at a substantially constant value with decreasing moisture content of the air.

2. A method of conditioning gases which comprises passing a stream of gas in extended surface contact with a plurality of successive streams of hygroscopic solutions of progressively lower absolute vapor pressure and temperature, while passing a stream of cooling fluid countercurrent to said gas stream in indirect heat exchange relation with each of said streams of hygroscopic solutions to maintain the heat transfer potential between the gas stream and the hygroscopic solutions at a substantially constant value with decreasing moisture content of the air, and maintaining the concentration of said streams of solution by supplying concentrated solution to each of said streams.

3. A method of conditioning gases which comprises passing a stream of gas in extended surface contact with a plurality of successive streams of hygroscopic solutions of progressively lower absolute vapor pressure and temperature, while passing a stream of cooling fluid counter-current to said gas stream in indirect heat exchange relation with each of said streams of hygroscopic solutions to maintain the heat transfer potential between the gas stream and the hygroscopic solutions at a substantially constant value with decreasing moisture content of the air, and maintaining the concentration of said streams of solution by supplying concentrated solution to each of said streams at points intermediate the ends of the zones of contact of the stream of gas with said streams of solution.

4. A method of conditioning gases which comprises passing a stream of gas in extended surface contact with a plurality of successive streams of hygroscopic solutions of progressively lower absolute vapor pressure and temperature, while passing a stream of cooling fluid counter-current to said gas stream in indirect heat exchange relation with each of said streams of hygroscopic solution to maintain the heat transfer potential betwen the gas stream and the hygroscopic solutions at a substantially constant value with decreasing moisture content of the air, maintaining the concentration of said streams of solution by withdrawing a portion of each of said streams, concentrating said portions by heating to remove water vapor, at least a part of the heating of one of said portions being effected by indirect heat exchange with the vapor evolved from another of said portions while maintaining the solution being heated by the evolved vapor under conditions of lower effective aqueous partial pressure than the solution supplying the vapor, and returning said concentrated portions to the streams of hygroscopic solution from which they were withdrawn.

5. A method of conditioning gases which comprises passing a stream of gas in extended surface contact with a plurality of successive streams of hygroscopic solutions of progressively lower absolute pressure and temperature, while passing a stream of cooling fluid counter-current to said gas stream in indirect heat exchange relation with each of said streams of hygroscopic solutions to maintain the heat transfer potential between the gas stream and the hygroscopic solutions at a substantially constant value with decreasing moisture content of the air, maintaining the concentration of said streams of solution by withdrawing a portion of each of said streams, concentrating said portions by heating to remove water vapor, at least a part of the heating of one of said portions being effected by indirect heat exchange with the vapor evolved from another of said portions while maintaining the solutions being heated by the evolved vapor under conditions of lower effective aqueous partial pressure than the solution supplying the vapor, and supplying said concentrated solution to the streams of hygroscopic solutions at points intermediate the ends of the zones of contact of the stream of gas with said streams of solution.

ROBERT B. P. CRAWFORD.